Aug. 12, 1958  A. B. ESSEX ET AL  2,847,178
SHOCK MOUNT

Filed Jan. 7, 1957  3 Sheets-Sheet 1

INVENTORS
ALOIS B. ESSEX
SAMUEL SCHALKOWSKY

BY Victor D. Borst

ATTORNEY

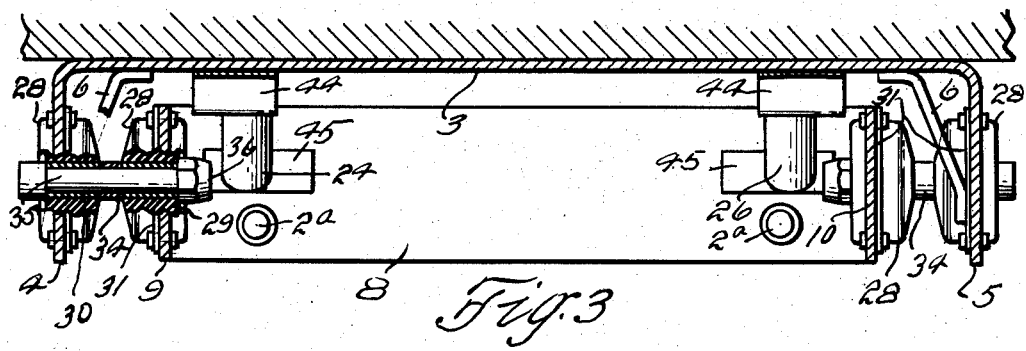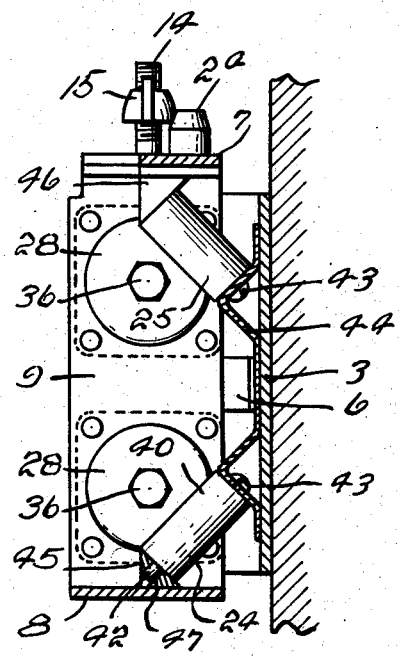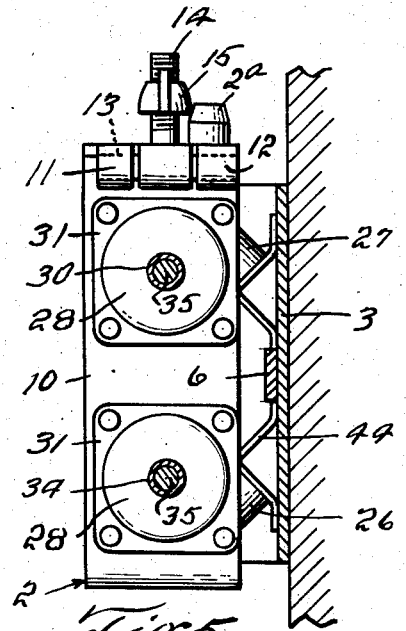

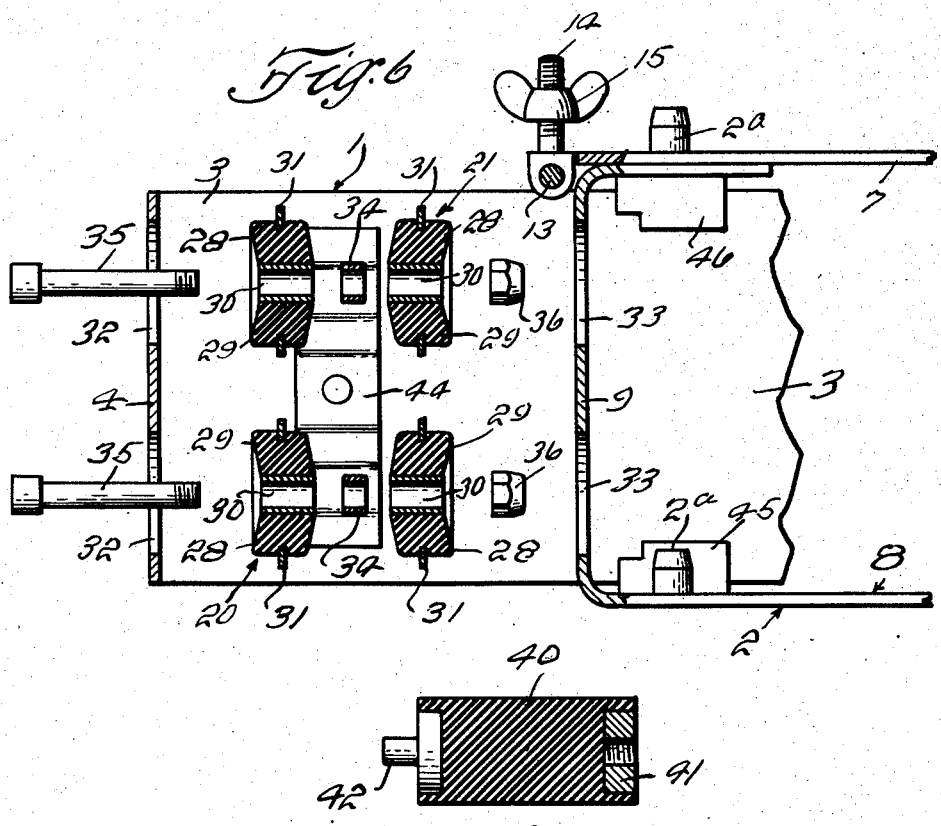
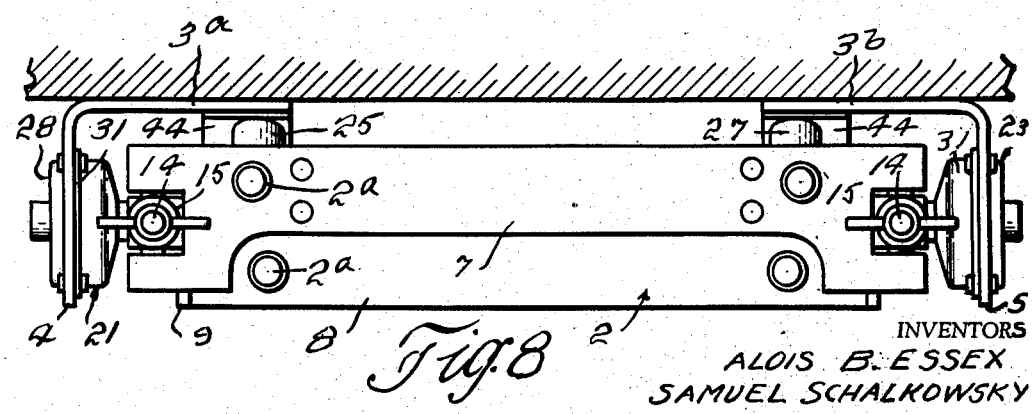

United States Patent Office 2,847,178
Patented Aug. 12, 1958

2,847,178

SHOCK MOUNT

Alois B. Essex, Glendale, and Samuel Schalkowsky, Astoria, N. Y., assignors to Sperry Rand Corporation, Ford Instrument Company Division, Long Island City, N. Y., a corporation of Delaware Application January 7, 1957, Serial No. 632,875

2 Claims. (Cl. 248—358)

This invention relates to a flexible suspension mechanism by which equipment mounted thereon is isolated from external vibrations. The invention is particularly adapted for mounting control or other instruments on guided missiles in such a manner as to eliminate or counteract the effect of vibration and acceleration encountered during flight.

The principal object of the invention is to provide a flexible suspension mechanism by which equipment mounted thereby is protected against the combined effect of vibrations which are superimposed on static accelerations.

Another object of the invention is to provide a suspension mechanism of the aforesaid character in which no adverse effects are encountered should a resonant condition of the mounted equipment occur.

The apparatus of the invention is made up from commercially available flexible mountings which are arranged and connected together in such a manner as to provide the desired result, although these mountings taken separately have the opposite characteristics.

The suspension mechanism is made of a bracket member which is adapted to be secured to a guided missile or other vehicle and a supporting frame member to which the equipment is secured. These two members are interconnected by pairs of vibration isolators arranged in series, and by snubbing mounts which are disposed transversely to the plane of the vibration isolators. The effect of the series arrangement of the vibration isolators is to provide extended linear deflections in both the radial and axial directions of the vibration isolators whereas a single vibration isolator has only a very limited linear deflection in the radial direction. Also with this series arrangement the gradient of the pair of mountings becomes softer in the radial direction compared to the axial gradient whereas a single vibration isolator has the opposite characteristic. By adding the snubbing mounts transversely to the plane of the vibration isolators an equal gradient in all directions of the complete assembly is obtained. The net effect of such an arrangement is to provide a flexible suspension mechanism which maintains a linear gradient for sufficient deflections to permit equal vibration isolation under the combined effect of 10 "g's" static acceleration and an applied vibration of .065" double amplitude. Also, by adjusting the assembly to a natural frequency of 20–25 C. P. S., no bottoming will occur under the above combined conditions even when a resonance condition having an amplification of eight (8) times the applied amplitude occurs.

Having stated the principal objects of the invention, other more specific objects will be apparent from the following specification and the accompanying drawings forming a part thereof in which:

Fig. 3 is a horizontal sectional view taken substantially on the line 3—3 of Fig. 1;

Fig. 4 is a vertical transverse sectional view taken substantially on the line 4—4 of Fig. 1;

Fig. 5 is a vertical transverse sectional view taken substantially on the line 5—5 of Fig. 1;

Fig. 6 is a vertical sectional view through one side of the mechanism showing the various elements in separated positions;

Fig. 7 is an enlarged central section through one of the snubbing mounts; and

Fig. 8 is a view similar to Fig. 2 showing a slightly modified form of the invention.

Figure 1:
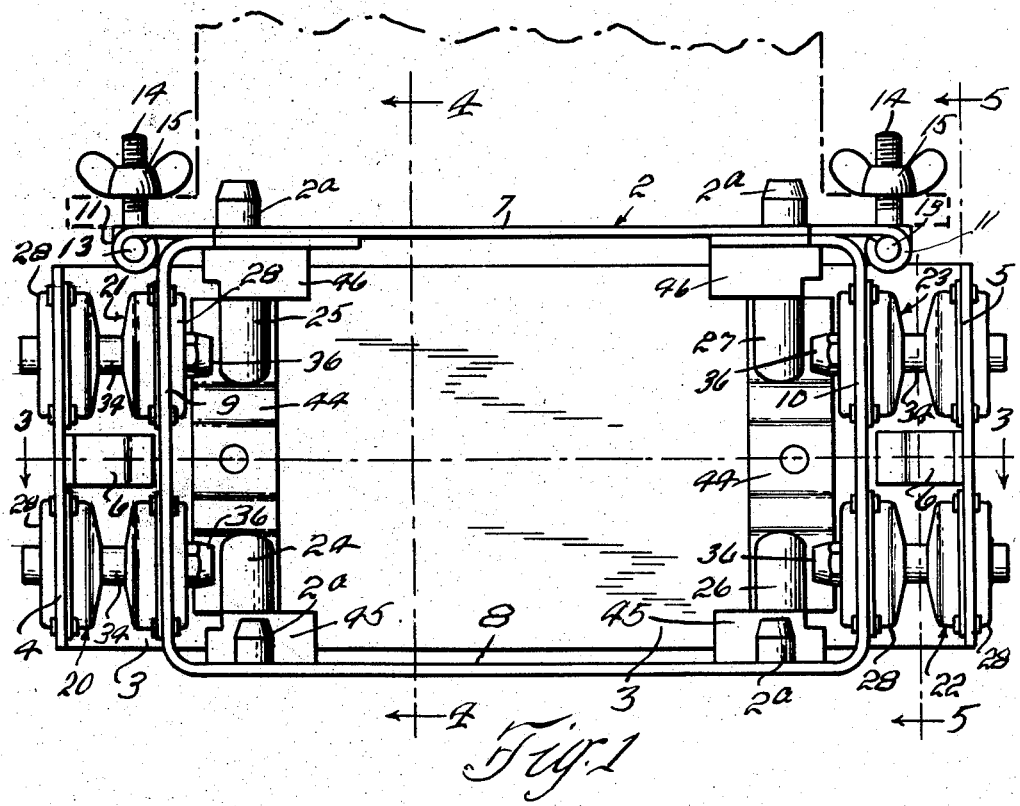
Fig. 1 is a front elevation of a flexible suspension mechanism constructed according to our invention.
Figure 2:
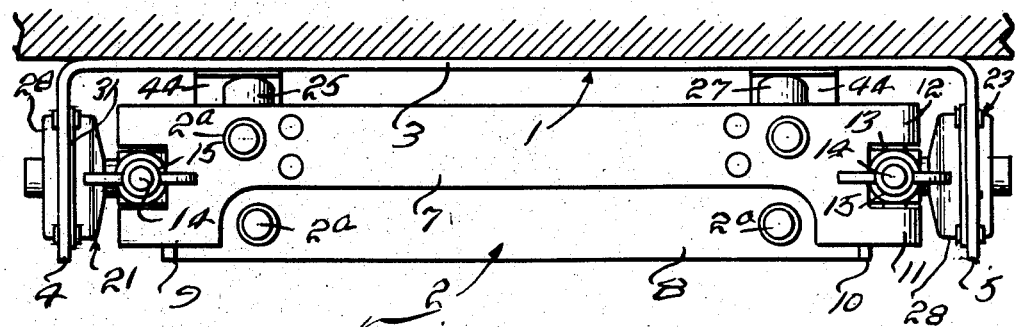
Fig. 2 is a top plan view of the mechanism as shown in Fig. 1.

Referring now to the drawings by reference characters, the numeral 1 indicates generally a bracket member and the numeral 2 indicates generally a supporting frame member. The bracket member 1 which is adapted to be rigidly secured to a vehicle, is generally U-shaped in plan and comprises a base 3 and a pair of parallel laterally spaced arms 4 and 5 which are integral with the base 3 and extend forwardly therefrom at right angles thereto. Angularly disposed braces 6 which are secured to and between the base 3 and the arms 4 and 5 are provided to rigidly maintain the angular relation of the arms 4 and 5 with respect to the base 3 and to each other.

The instrument supporting frame member 2 comprises a rectangular open sided frame having the spaced upper and lower walls 7 and 8 which are connected together by the spaced parallel end walls 9 and 10. The upper and lower walls 7 and 8 are provided with upwardly extending studs 2ᵃ for facilitating the mounting of instruments upon the supporting frame 2, one such instrument being indicated by dot and dash lines in Fig. 1. Each end of the upper wall 7 is extended out beyond the adjacent end wall 9 or 10 and is provided with a pair of spaced bearings 11 and 12 in which is rotatably mounted a cylindrical pin 13. Each pin 13 has a threaded bolt 14 secured thereto which extends outwardly therefrom between the bearings 11 and 12 and is provided with a wing nut 15. The bolts 14 and nuts 15 serve to releasably secure instruments upon the frame 2.

The frame 2 is disposed between the arms 4 and 5 of the bracket member 1 in forwardly spaced relation to the base 3 of the bracket member 1. The end wall 9 of the frame 2 is resiliently connected to the arm 4 of the bracket member 1 by a pair of vertically spaced similar vibration isolators 20 and 21; and the end wall 10 of the frame 2 is resiliently connected to the arm 5 of the bracket member 1 by a pair of vertically spaced vibration isolators 22 and 23 which are identical in construction with the vibration isolators 20 and 21. The vibration isolators 20 and 22 are disposed in horizontal axial alignment with each other; and the vibration isolators 21 and 23 are likewise disposed in horizontal axial alignment with each other. The arrangement of all of the vibration isolators 20 to 23 is such that all of the axes thereof are disposed in the same vertical plane.

A pair of angularly disposed vertically spaced snubbing mounts 24 and 25 are interposed between the base 3 of the bracket member 1 and the upper and lower walls 7 and 8 of the frame 2 adjacent the end wall 9 thereof; and a pair of similar snubbing mounts 26 and 27 are similarly disposed adjacent the end wall 10 of the frame 2. The axes of the snubbing mounts 24 and 25 are both disposed in the same vertical plane which is perpendicular to the plane of the axes of the vibration isolators; and the snubbing mounts 26 and 27 are both disposed in a plane parallel to the plane of the snubbing mounts 24 and 25.

The vibration isolators 20 to 23 each comprises a pair of commercially available shock absorbers 28; and each shock absorber 28 comprises a generally cylindrical resilient rubber body 29 which is vulcanized to an axially disposed metal bushing 30 and to an outwardly extending medially disposed annular metal flange 31. One shock absorber 28 of each vibration isolator 20 to 23 extends through a complementary aperture 32 in one of the bracket arms 4 or 5 and is permanently secured in place by riveting the flange 31 to an arm; and the other vibration isolator 28 of each vibration isolator 20 to 23 extends through an aperture 33 in one of the end walls 9 or 10 and is permanently secured in place by riveting the flange 31 thereof to an end wall. The two shock absorbers 28 of each vibration isolator are rigidly secured together with a spacing collar 34 therebetween by a bolt 35 which extends through the bushings 30 and collar 34 and is provided with clamping nut 36.

Each of the snubbing mounts 24 to 27 consists of a commercially available shock absorber which comprises a resilient cylindrical body 40 having an internally threaded nut 41 embedded in one end thereof and an outwardly extending axial stud 42 secured to the other end thereof.

The snubbing mounts 24 and 25 are secured by screws 43 to a bracket 44 which is permanently fastened to the base 3 of the bracket member 1 adjacent the end wall 9 of the frame 2; and the snubbing mounts 26 and 27 are similarly secured to a bracket 44 adjacent the end wall 10 of the frame 2. The snubbing mounts 24 and 26 extend forwardly and downwardly from the brackets 44 into engagement with abutments 45 secured to the upper side of the bottom wall 8 of the frame 2; and the snubbing mounts 25 and 27 extend forwardly and upwardly from the brackets 44 into engagement with abutments 46 secured to the underside of the top wall 7 of the frame 2. The abutments 45 and 46 are provided with bores 47 for the reception of the studs 42.

In Fig. 8 we have shown a slightly modified form of the invention in which the base 3 consists of two sections 3a and 3b which are adapted to be secured in fixed spaced relation to a vehicle. The arm 4 is formed integrally with the section 3a and extends outwardly therefrom; and the arm 5 is formed integrally with the section 3b and extends outwardly therefrom parallel to the arm 4 when the sections 3a and 3b are secured to the vehicle, with the spacing of the sections with respect to each other being such as to provide the proper spacing of the arms 4 and 5 for the accommodation of the instrument supporting frame 2. Otherwise this form of the invention is identical with that shown in Figs. 1 to 7 and the same reference numerals have been applied to like parts.

From the foregoing it will be apparent to those skilled in this art that we have provided a very simple and efficient mechanism for accomplishing the objects of the invention.

It is to be understood that we are not limited to the specific construction shown and described herein as various modifications may be made therein within the spirit of the invention and the scope of the appended claims.

We claim:

1. A flexible suspension mechanism of the character described comprising bracket means having a base which is adapted to be secured in fixed position on a vehicle and a pair of laterally spaced forwardly extending vertically disposed arms, a rectangular instrument supporting frame having a pair of spaced vertically disposed side members connected together at the upper ends thereof by a horizontally disposed top member, and at the lower ends thereof by a horizontally disposed bottom member, an upper abutment member secured to the underside of said top member and a lower abutment member secured to the upper side of said bottom member, means by which said frame is mounted between said forwardly extending arms in forwardly spaced relation to said base, said means comprising; a pair of similar horizontal axially aligned resilient vibration isolators one of which is connected to and between one of said arms and the adjacent side member of said frame and the other of which is connected to and between the other of said arms and the adjacent side member of said frame, and a pair of similar resilient shock absorbers interposed between said base and said frame with the axes thereof disposed in a plane perpendicular to the axes of said vibration isolators, one of said shock absorbers being connected to said base and extending forwardly and upwardly therefrom into engagement with the said upper abutment member which is secured to the underside of the said top member of said frame, and the other of said shock absorbers being connected to said base and extending forwardly and downwardly therefrom into engagement with the said lower abutment member which is secured to the upper side of the said bottom member of said frame.

2. A flexible suspension mechanism of the character described comprising bracket means having a base which is adapted to be secured in fixed position on a vehicle and a pair of laterally spaced forwardly extending vertically disposed arms, a rectangular instrument supporting frame having a pair of spaced vertically disposed side members connected together at the upper ends thereof by a horizontally disposed top member, and at the lower ends thereof by a horizontally disposed bottom member, an upper abutment member secured to the underside of said top member and a lower abutment member secured to the upper side of said bottom member, means by which said frame is mounted between said forwardly extending arms in forwardly spaced relation to said base, said means comprising; an upper pair of similar horizontally aligned resilient vibration isolators one of which is connected to and between one of said arms and the adjacent side member of said frame and the other of which is connected to and between the other of said arms and the adjacent side member of said frame, a lower pair of similar horizontal axially aligned resilient vibration isolators one of which is connected to and between the said one of said arms and the said adjacent side of said frame and the other of which is connected to and between the said other of said arms and the said adjacent side member of said frame, and two pairs of laterally spaced similar resilient upper and lower shock absorbers interposed between said base and said frame with the axes thereof disposed in planes perpendicular to the axes of said vibration isolators, the upper shock absorber of each of said pairs of shock absorbers being connected to said base and extending forwardly and upwardly therefrom into engagement with the said upper abutment member which is secured to the underside of the said top member of said frame, and the lower shock absorber of each of said pair of shock absorbers being connected to said base and extending forwardly and downwardly therefrom into engagement with the said lower abutment member which is secured to the upper side of the said bottom member of said frame.

References Cited in the file of this patent
UNITED STATES PATENTS

| | | |
|---|---|---|
| 2,059,313 | Carter | Nov. 3, 1936 |
| 2,704,196 | Beach | Mar. 15, 1955 |